United States Patent [19]

Gotoh et al.

[11] Patent Number: 5,028,567

[45] Date of Patent: Jul. 2, 1991

[54] GLASS-CERAMICS

[75] Inventors: Naoyuki Gotoh; Makoto Hayasaka, both of Sagamihara, Japan

[73] Assignee: 501 Kabushiki Kaisha Ohara, Sagamihara, Japan

[21] Appl. No.: 198,758

[22] Filed: May 24, 1988

[51] Int. Cl.$^5$ ............................................ C03C 10/02
[52] U.S. Cl. ........................................ 501/10; 501/59; 501/61; 501/62; 501/74; 501/76
[58] Field of Search ................... 501/10, 59, 61, 62, 501/74, 76

[56] References Cited

U.S. PATENT DOCUMENTS

| | | | |
|---|---|---|---|
| 2,920,971 | 1/1960 | Stookey | 501/2 |
| 3,681,097 | 8/1972 | Beall et al. | 501/4 |
| 4,687,750 | 8/1987 | Pinckney | 501/10 |

Primary Examiner—Mark L. Bell
Attorney, Agent, or Firm—Ladas & Parry

[57] ABSTRACT

A glass-ceramic obtained by heat treating a parent glass in which specific amounts of MgO and PbO are added to the $SiO_2$ - $Al_2O_3$ - ZnO - $TiO_2$ system glass has a wide range of coefficients of thermal expansion and improved fineness in diameters of crystals and also improved chemical durability or thermal expansion curve.

8 Claims, 1 Drawing Sheet

GLASS-CERAMICS

BACKGROUND OF THE INVENTION

This invention relates to opaque and transparent glass-ceramics containing gahnite suitable for use as a substrate material in various electric, electronic, and opto-electronic devices such, for example, as magnetic heads, liquid crystal displays, solar batteries, photomasks and optomagnetic disks. More particularly, the invention relates to two glass-ceramics obtained by melting and heat treating a $SiO_2$ - $Al_2O_3$ - ZnO - MgO - PbO system glass of a specific composition which is substantially free of an alkali ingredient, i.e., an opaque glass-ceramic containing gahnite which is substantially free of flexion in the thermal expansion curve and has an improved chemical durability, and a transparent glass-ceramic containing gahnite having an excellent optical homogeneity, which is obtainable advantageously from the economic standpoint.

There is a growing demand for magnetic heads which are important components for recording, reproducing and erasing information in various devices including audio devices, video tape recorders and computers. Particularly, demands for making these devices more compact and increasing density of information have led to rapid progress in the development of a thin film magnetic head utilizing thin film techniques such as integrated circuits.

The thin film magnetic head is made by forming a thin film of magnetic substance over a substrate. A thin film made of Ni - Zn ferrite, Mn - Zn ferrite, permalloy (Fe - Ni), sendust (Fe - Al - Si) or amorphous substance of such material performs functions of recording, reproducing and erasing information and a substrate performs other functions including supporting the magnetic substance and moving in sliding movement. For this reason, the substrate is required to have the following general properties:

(1) For achieving a good bonding with the magnetic substance, a coefficient of thermal expansion must be selected from a range between about $70\text{-}180 \times 10^{-7}$ /° C. in accordance with the type of magnetic substance.

(2) The substrate must have about the same hardness as the magnetic substance, i.e., Vickers hardness of about 600-1150 $Kgf/mm^2$, so as to prevent occurrence of partial wear due to sliding movement of the substrate relative to a magnetic tape or a disk.

(3) The substrate must have a structure which is close, uniform and fine.

(4) The substrate must have a uniform quality and good productivity.

In the above described electric, electronic and opto-electronic devices other than magnetic heads also, various components made by bonding or thin-film forming a crystalline or amorphous metal, alloy or metal oxide on substrates are used. These substrates are required to have, in accordance with the material of the components, the following properties:

(5) A coefficient of thermal expansion must be selected from a wide range between $25\text{-}200 \times 10^{-7}$ /° C.

(6) The substrate must have a very fine structure and a transparent and highly uniform article, in addition to an opaque article, must be manufactured therefrom.

(7) The substrate must be substantially free of an alkali ion, since alkali ions in the substrate would be diffused in the thin film with a result that its properties would be degraded.

(8) The substrate must have good refractoriness, i.e., a transformation temperature of about 780° C. or higher, since the substrate is exposed to high temperatures during the process of forming of the thin film.

(9) The substrate must have sufficient chemical durability against rinsing or etching performed by using various chemical reagents.

Glass-ceramics are listed as one of the materials which are poreless and close in structure and therefore are considered to satisfy the above mentioned requirements for substrates. Particularly, there have been disclosed some glass ceramics, as suitable materials for substrates, which are obtained by heat treating a parent glass of the $SiO_2$ - $Al_2O_3$ - ZnO - nucleating agent system and contain crystals of gahnite, willemite, $\alpha$ - cristobalite or $\alpha$ - quartz grown therein as the predominant crystal phase.

U.S. Pat. No. 2,920,971, for example, discloses a $SiO_2$ - $Al_2O_3$ - ZnO - $TiO_2$ system glass as a parent glass in which one or more of $Li_2O$, BeO, MgO, CaO, ZnO, SrO, CdO, BaO, PbO and MnO is added to $SiO_2$, $Al_2O_3$ and $TiO_2$, and discloses also a method for obtaining glass-ceramic articles by subjecting this parent glass to a heat treatment which consists of two stages of heat treating the parent glass for development of nuclei and further heat treating it for subsequent growth of crystals. In the glass-ceramic articles obtained by this method, however, diameters of crystals grown are 0.1-20 $\mu$ as described in the specification of the U.S. Patent, which are too coarse to meet the above described requirement (6) concerning the fineness and transparency of the structure of the substrate. Besides, a glass-ceramic article among the articles in this U.S. Patent which is obtained from a parent glass containing a relatively large amount of ZnO tends to be accompanied by growing of willemite crystals and such article containing willemite crystals has extremely poor chemical durability. Further, in a case where crystals which are of high thermal expansion characteristics are to be grown for obtaining a glass-ceramic article of relatively high thermal expansion characteristics, $\alpha$-cristobalite crystals which cause a considerable flexion due to phase transformation in the thermal expansion curve of the article are grown excessively which adversely affects bonding of the article with a magnetic or other substance.

U.S. Pat. No. 3,681,102 discloses transparent glass-ceramics obtained by subjecting a $SiO_2$ - $Al_2O_3$ - ZnO - $ZrO_2$ system parent glass to the two-stage heat treatment and containing gahnite as the predominant crystal phase. The glass-ceramics have fine diameters of crystals which are less than 1000 Å (0.1 $\mu$). Since, however, the melting temperature of the parent glass is a high one in the range of 1650°-1800° C., it is not easy to obtain an optically uniform glass-ceramic article.

For improving the transparency of the finished articles and the melting property of the parent glass of these transparent glass-ceramics which have been found inadequate, U.S. Pat. No. 4,687,750 discloses transparent glass-ceramics obtained by applying the two-stage heat treatment to a parent glass in which the $SiO_2$ - $Al_2O_3$ - ZnO sytem glass and a nucleating agent of $TiO_2$ and ($K_2O + Rb_2O + Cs_2O$) coexist. In these glass-ceramics, the fineness of diameters of crystals has been improved to less than 300 Å. The melting property of the parent glass, however, is not considered to have been sufficiently improved in these glass-ceramics. Indeed, as described in the specification of this U.S. Patent, it requires melting of the parent glass at about 1600° C. for 16 hours in a platinum crucible to obtain a slab of about 6"×6"×0.5". This results in increase in cost of the article and therefore is not advantageous economically. This also makes it difficult to obtain an article having an excellent homogeneity. Moreover, an alkali ingredient must essentially be contained in these glass-ceramics.

Japanese Patent Publication No. 46-16518 discloses a fortified glass-ceramic obtained by applying a one-stage stage heat treatment to a $SiO_2$ - $Al_2O_3$ - ZnO - MgO - $ZrO_2$ system glass to have $\beta$ -quartz which is of low thermal expansion characteristics crystallized in its surface layer and $\alpha$ -quartz or spinel which is of higher thermal expansion characteristics crystallized in its interior portion. Japanese Laid-open Patent Publication No. 59-203736 discloses a high thermal expansion glass-ceramic obtained by heat treating a $SiO_2$ - $Al_2O_3$ - ZnO - $ZrO_2$ - $TiO_2$ system glass and containing $\alpha$ -quartz and $\alpha$ - critobalite as the prodominant crystal phases. These glass-ceramics, however, have considerable flexions in their thermal expansion curves. Besides, it is difficult in these glass-ceramics to prevent the tendency to increasing coarseness of crystal grains despite attempted efforts in improving the heat treatment conditions.

DETAILED DESCRIPTION OF THE INVENTION

It is, therefore, an object of the invention to provide a glass-ceramic which satisfies all of the above described requirements and has an improved chemical durability or an economic advantage and has substantially eliminated flexion occurring in its thermal expansion curve.

Studies and experiments made by the inventors for achieving the above described objects of the invention have led to a finding of two novel glass-ceramics having improved characteristics obtainable from a parent glass of the same system having a specifically selected composition. That is, if a parent glass in which specific amounts of MgO and PbO which have not heretofore been disclosed specifically are added as essential ingredients to the $SiO_2$ - $Al_2O_3$ - ZnO - $TiO_2$ system glass is heat treated, an opaque (a semi-transparent glass-ceramic is included in the present invention) glass-ceramic containing gahnite is obtained which has a proper hardness and a wide range of linear coefficients of thermal expansion, has generally finer diameters of crystals, is free of deterioration in chemical durability due to crystallization of willemite and also of occurrence of flexion in the thermal expansion curve due to crystallization of excessive amount of $\alpha$-cristobalite and further is free of flexion due to the phase transition of $\alpha$ -quartz despite crystallization of a large amount of $\alpha$-quartz.

It has been found, unexpectedly, that, by heat treating the parent glass of the above composition, a glass-ceramic having a high optical homogeneity and an excellent transparency can be obtained owing to more advantageous conditions in melting the parent glass. The present invention has been made on the basis of these findings.

The glass-ceramic made according to the invention is characterized in that it is obtained by melting and heat treating a parent glass being substantially free of an alkali ingredient comprising the following ingredients in weight percent:

| | |
|---|---|
| $SiO_2$ | 30–65%, |
| $Al_2O_3$ | 5–25%, |
| ZnO | 8–40%, |
| MgO | 2–20%, |
| PbO | 0.5–15%, |
| CaO + SrO + BaO | 0–15%, |
| $TiO_2$ | 2–15%, |
| $B_2O_3$ | 0–6%, |
| $La_2O_3$ + $Y_2O_3$ + $Gd_2O_3$ + $Ta_2O_5$ + $Nb_2O_5$ + $WO_3$ | 0–10%, |
| $ZrO_2$ + $P_2O_5$ + $SnO_2$ in which | 0–5%, |
| $ZrO_2$ | 0–2.5%, |
| $P_2O_5$ | 0–5%, |
| $SnO_2$ | 0–2%, |
| $As_2O_3$ + $Sb_2O_3$ | 0–2%, |
| $MnO_2$ + $Ni_2O_3$ + $CO_2O_3$ + $Fe_2O_3$ + $Cu_2O$ + $GeO_2$ + $Bi_2O_3$ | 0–10%, |
| $Li_2O$ + $Na_2O$ | 0–1%, |
| and a total amount of F contained in a fluoride or fluorides of one or more metal elements in said metal oxide or oxides | 0–5% | said glass-ceramic containing gahnite as predominant crystals and being substantially free of $\alpha$-cristobalite and willemite, having improved chemical durability and being free of flexion in its thermal expansion curve, having diameters of crystals grown ranging between 0.02 and 5 $\mu$, having coefficients of thermal expansion in the range of about 41–200 × $10^{-7}$/°C., and exhibiting an opaque appearance. In one aspect of the invention, the glass-ceramic obtained by melting and heat treating the parent glass of the same composition, contains gahnite as predominant crystals, and has diameters of crystals grown ranging between 0.005–0.03 $\mu$ and exhibits an excellent transparent appearance.

The above-described opaque glass-ceramic can be obtained by the conventional two-stage heat treatment used for development of nuclei and subsequent growth of crystals. It can also be obtained by a one-stage heat treatment. In a one-stage heat treatment, the upper limit of the temperature for growing crystals should preferably be in the range of 800°–1150° C. In the case of obtaining the transparent glass-ceramic, the upper limit of the temperature for growing crystals should preferably be 1000° C.

The composition of the glass-ceramic according to the invention can be expressed, as in the parent glass, on the oxide basis. Reasons for limiting the ranges of the ingredients of the parent glass which constitutes the starting material of the glass-ceramic will now be described.

If the $SiO_2$ ingredient is less than 30%, the glass-ceramic article obtained tends to become coarse in its structure and chemical durability and hardness are deteriorated. If the amount of the $SiO_2$ ingredient exceeds 65%, it becomes difficult to melt the parent glass.

If the $Al_2O_3$ ingredient is less than 5%, chemical durability and hardness of the article are deteriorated whereas if the amount of the $Al_2O_3$ ingredient exceeds 25%, the glass tends to become unstable and, besides, in a case where a high thermal expansion glass-ceramic article is to be obtained, the amount of crystallization of $\alpha$-quartz of high thermal expansion characteristics is reduced excessively with resulting difficulty in obtaining the desired high thermal expansion article.

The ZnO ingredient is a very important ingredient for growing gahnite crystals having ZnO as one of its constituent elements by heat treating the parent glass and thereby improving hardness and heat resistivity of the article. If, however, the amount of ZnO ingredient is less than 8%, this effect is not produced whereas if the amount of this ingredient exceeds 40%, the glass tends to become instable and crystal grains tend to become coarse by heat treatment.

If the MgO ingredient is less than 2%, the glass becomes instable and its melting property is deteriorated and, further, hardness of the article is reduced. If the amount of this ingredient exceeds 20%, crystal grains of the article tend to become coarse resulting in generation of cracks. Accordingly, the amount of MgO should be 2% or more in producing either an opaque product or a transparent product and may be 5-20% in the case of producing an opaque product and 3-20% in the case of producing a transparent product.

The PbO ingredient is an important ingredient which has a remarkable effect of shifting the center of diameter distribution of crystals contained in the glass-ceramic of the invention towards the small diameter direction in the presence of the MgO ingredient. Further, the PbO ingredient has secondary effects of preventing growing of willemite crystals which tend to grow if the amount of the ZnO ingredient exceeds about 15% and are associated with deterioration of chemical durability, preventing excessive growing of α-cristobalite crystals which bring about a relatively remarkable flexion in the vicinity of 200° C. in the thermal expansion curve, preventing also occurrence of flexion in the vicinity of 550° C. due to the phase transformation of α-quartz, and imparting desired linear coefficients of thermal expansion. The CaO, SrO and BaO ingredients which function to enhance these effects of the PbO ingredient can be added optionally. The PbO, CaO, SrO and BaO ingredients contribute also to improvement of melting property of the glass and stability of the glass during forming thereof. If, however, the amount of the PbO ingredient is less than 0.5%, the above described effects cannot be sufficiently achieved. If, on the contrary, the PbO ingredient exceeds 15% or the total amount of one or more of the CaO, SrO and BaO ingredients exceeds 15%, the desired growing of crystals becomes difficut and crystal grains grown become coarse. If a relatively high temperature is used in the heat treatment for producing the glass-ceramic of the present invention, diameters of crystals generally tend to become large. For achieving diameters of crystals within a range between 0.02 and 5 $\mu$ while preventing occurrence of flexion in the thermal expansion curve, the ratio of MgO to (PbO+CaO+SrO+BaO) in weight is preferably within a range between 1:1 and 3:1. FIG. 1 in the accompanying drawing illustrates, for the purpose of comparison, thermal expansion curve (a) of a glass-ceramic obtained by subjecting a glass having a composition of 49.0% $SiO_2$, 19.0% $Al_2O_3$, 7.0% MaO, 19.7% ZnO, 5.0% $TiO_2$, 0.3% $As_2O_3$ to a one-stage heat treatment in which the glass is heated at temperatures raised at a rate of 4.6° C./min. and held at 1100° C. for 120 minutes and thermal expansion curve (b) of a glass-ceramic obtained by subjecting a glass having the composition of the glass of the curve (a) as its basic composition and further having 2.5% PbO and 2.0% BaO added thereto, with the ratio in weight of MgO to PbO+BaO being about 1.5:1, to the same heat treatment as in the glass of the curve (a). As will be apparent from the figure, the flexion of the thermal expansion curve can be effectively prevented by coexistence of MgO and (PbO+BaO).

The $TiO_2$ ingredient is essential as a nucleating agent. If the amount of $TiO_2$ ingredient is less than 2%, desired crystals cannot be grown whereas if it exceeds 15%, the glass tends to become instable.

The $B_2O_3$ ingredient is effective for improving the melting property of the glass but if the amount of this ingredient exceeds 6%, desired crystals cannot be grown.

The $La_2O_3$, $Y_2O_3$, $Gd_2O_3$, $Ta_2O_5$, $Nb_2O_5$ and $WO_3$ ingredients are effective for improving hardness and chemical durability of the article and these ingredients can be added to the glass up to the total amount of 10% of one or more of these ingredients.

The $ZrO_2$, $P_2O_5$ and $SnO_2$ ingredients can be used auxiliarily as nucleating agents. If the total amount of one or more of these ingredients exceeds 5%, or the respective ingredients exceed 2.5%, 5% and 2%, the glass becomes less stable and the structure of the article becomes ununiform.

The $As_2O_3$ and/or $Sb_2O_3$ ingredients can be added as fining agents in melting the glass. The addition of 2% or less in the total amount of one or more of these ingredients will suffice.

Besides the above ingredients, the $MnO_2$, $Ni_2O_3$, $Co_2O_3$, $Fe_2O_3$ and $Cu_2O$ ingredients as coloring agents, and the $GeO_2$ and $Bi_2O_3$ ingredients up to the total amount of 10% and the $Li_2O$ and $Na_2O$ ingredients as fluxes up to the total amount of 1% may be added, if necessary, within a range which will not impair the desired properties of the article.

A fluoride or fluorides of one or more metal elements in the above metal oxides are effective for controlling crystallization of the glass. If, however, the amount of such fluoride or fluorides exceed 5% in terms of the total amount of F, the glass tends to become instable and, moreover, a desired glass-ceramic article cannot be obtained.

A method for manufacturing the glass-ceramic according to the invention may comprise melting the parent glass having the above described selected ingredients, hot working it and thereafter subjecting it to a heat treatment for development of nuclei and subsequent growth of crystals.

By performing the one-stage heat treatment at a predetermined temperature in a range between 800 and 1150° C., the glass-ceramic having diameters of crystals ranging between 0.02 and 5 $\mu$, exhibiting a semi-transparent or opaque appearance and having the above described desired properties can be readily obtained without relying upon the conventional complicated two-stage heat treatment. Further, by subjecting the parent glass to the two-stage heat treatment including the nucleating heat treatment and the subsequent crystal growing heat treatment at temperatures up to 1000° C., the glass-ceramic having diameters of crystals ranging between 0.005 and 0.03 $\mu$, exhibiting good transparency and having the above described desired properties can be readily obtained.

Further, in manufacturing the opaque and transparent glass-ceramics of the present invention, it has been found that, if the parent glass is crystallized after being subjected to precision polishing such as mirror polishing in the cold, the degree of roughness of the polished surface is not substantially changed. If, accordingly, a glass-ceramic article provided with precision polishing is required, polishing should preferably be performed in the parent glass stage in which the hardness of the glass is relatively small.

DESCRIPTION OF PREFERRED EMBODIMENTS

Figure 1:
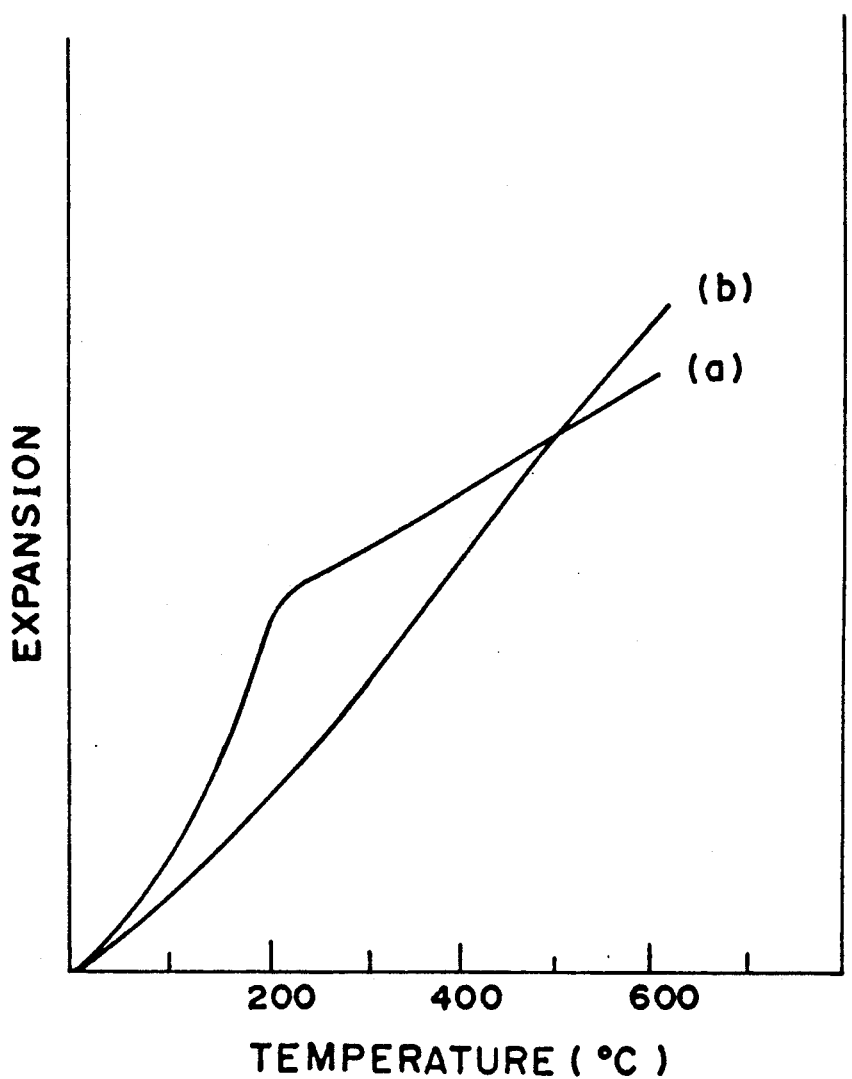
FIG. 1 of the drawing is a diagram showing a comparison of a thermal expansion curve (a) of an opaque glass-ceramic obtained by heat treating the conventional parent glass composition with a thermal expansion curve (b) of the opaque glass-ceramic obtained according to the invention.

Description will now be made about preferred embodiments of the opaque and transparent glass-ceramics according to the invention.

Table 1 shows examples (No. 1 and No. 2) of the present invention and comparative examples (No. I and No. II) concerning the case where the conventional $SiO_2$ - $Al_2O_3$ - ZnO - $TiO_2$ system glass is treated, with respect to their compositions of parent glasses, heat treatment conditions in the one-stage or two-stage heat treatment, and results of measurement of linear coefficients of thermal expansion: $\alpha \times 10^{-7}$ cm/cm°C. (range of measured temperatures: 50°–600° C.), Vickers hardness (Hv), diameters of crystals and acid resistance values (RA(p)). The acid resistance values show rates of decrease in weight (%) of specimens after treating the specimens crushed to grain diameters in the range of 420–590 μm in 0.01 N nitric acid at 100° C. for 60 minutes.

The glass-ceramics shown in Table 1 were obtained by melting raw materials prepared to become the compositions shown in the table, refining the molten glasses, hot working the glasses into blocks and annealing them to provide the parent glasses, then cutting the parent glasses to specimens of 5 mm thick, exposing them to temperature which rises at a rate of 180° C./hr and subjecting them to the heat treatment shown in the table.

As shown in Table 1, Examples No. 1 and No. 2 which are glass-ceramics obtained by subjecting the respective parent glasses to the one-stage heat treatment are remarkably improved in the diameters of crystals grown and also in the flexion in the thermal expansion curves as compared with the Comparative Examples No. I and No. II obtained by subjecting the parent glasses in which MgO and PbO do not coexist to the two-stage heat treatment. The glass-ceramics of Examples No. 1 and No. 2 are also improved in the RA(p) values as compared with the glass-ceramic obtained in the Comparative Example I and containing willemite. The glass-ceramics of Examples No. 1 and No. 2 do not cause willemite crystals or excessive α-cristobalite crystals to grow in the glass-ceramics.

Even if the parent glasses of Comparative Examples No. I and No. II are subjected to the same one-stage heat treatment as in Examples No. 1 and No. 2, the glass-ceramics obtained do not exhibit the above described improvements as will be shown by Comparative Examples No. I' and No. II'.

Table 2 shows other examples (No. 1–No. 20) of the present invention. This table shows that semitransparent or opaque glass-ceramics having improved diameters of crystals ranging between 0.02 and 0.3 μ can be obtained by subjecting parent glass materials prepared in a similar manner to the examples in Table 1 to the one-stage heat treatment. Since these examples of Table 2 exhibit growing of gahnite or additionally, α-quartz and do not exhibit growing of willemite or α-cristobalite as predominant crystals, the glass-ceramics of these examples are superior in chemical durability and are substantially free of the flexion in the thermal expansion curve.

Table 3 shows examples of the present invention for obtaining the transparent glass-ceramics containing gahnite, showing compositions of parent glasses, two-stage heat treatment conditions and properties of the glass-ceramics obtained in a similar manner to Tables 1 and 2. The parent glasses were manufactured in the same manner as in the above described examples. In the case of obtaining the transparent article by the two-stage heat treatment, the above described preferable condition concerning the weight ratio of MgO to (PbO+CaO+SrO+BaO) in subjecting the semi-transparent or opaque article to the one-stage heat treatment is not applied. The transparent glass-ceramics of these examples in Table 3 have gahnite as the predominant crystals and have smaller diameters of crystals ranging between 0.005 and 0.02 μ exhibiting excellent transparency. Notwithstanding the fact that these glass-ceramics contain a large glassy portion, these glass-ceramics have much higher transformation points (Tg(°C.)) than general glasses so that they exhibit excellent refractoriness as compared with the general glasses. Further, growing of willemite and the above described high thermal expansion crystals is not observed in these examples. It should be noted that the semi-transparent or opaque glass-ceramics of the examples listed in Tables 1 and 2 are superior in refractoriness to the transparent glass-ceramics.

The opaque glass-ceramics of the Examples shown in Tables 1 and 2 have a coefficient of thermal expansion in the range of 41–200 and the transparent glass-ceramics of the Examples shown in Table 3 have a coefficient of thermal expansion in the range of 28–60. These glass-ceramics exhibit desired values of Vickers hardness. Besides, since these glass-ceramics are substantially free of alkali, they are harmless to all types of thin film materials. These glass-ceramics have relatively large coefficients of thermal conductivity of about 1–4 Kcal/m.hr.°C. In these examples, the parent glasses are obtained by mixing raw materials including oxides, carbonates, nitrates, sulfates and fluorides, melting them by a known melting device and then hot working the molten glass into a desired shape. In the case of using a platinum crucible with a capacity of 300 cc, for example, the raw materials can be melted and refined under the advantageous conditions of 1350°–1550° C.×3–8 hours. Accordingly, in the case of transparent glass-ceramic articles in particular, articles of better optical quality than the conventional articles can be efficiently manufactured.

As regards Examples No. 12 and No. 14 of Table 2 and Example No. 1 of Table 3, the foregoing heat treatment was applied to the parent glasses after precision mirror polishing the surfaces of the parent glasses in the cold thereby bringing their degrees of surface roughness (Rmax) to 185 Å, 70 Å and 70 Å. The degrees of surface roughness of the glass-ceramics obtained was 200 Å, 90 Å and 75 Å respectively, which shows that there is no substantial change in the mirror surface state.

In summary, the glass-ceramics of the invention which are obtained by melting and heat treating the $SiO_2$ - $Al_2O_3$ - ZnO - MgO - PbO - $TiO_2$ system parent glass of the specific composition are capable of realizing an opaque glass-ceramic containing gahnite. Moreover, a gahnite containing transparent glass-ceramic substantially free of an alkali ingredient having an excellent optical homogeneity can be manufactured in an advantageous manner.

TABLE 1

| | | Examples | | Comparative examples | | | |
|---|---|---|---|---|---|---|---|
| No. | | 1 | 2 | I | I' | II | II' |
| Composition of parent glass (weight %) | $SiO_2$ | 43.7 | 48.0 | 43.5 | | 44.6 | |
| | $Al_2O_3$ | 15.0 | 12.7 | 17.4 | | 17.9 | |
| | ZnO | 26.0 | 28.0 | 26.1 | | 17.9 | |
| | MgO | 6.0 | 5.5 | | | 8.9 | |
| | PbO | 3.0 | 2.5 | 4.3 | | | |
| | $TiO_2$ | 6.0 | 3.0 | 8.7 | | 10.7 | |
| | $As_2O_3$ | 0.3 | 0.3 | | | | |
| Heat treatment (°C. × hour) | | 1000 × 3 | 1100 × 2 | 700 × 1 ↓ 1200 × 1 | 1050 × 3 | 730 × 1 ↓ 1145 × 2 | 1050 × 2 |
| Glass-ceramic | $\alpha \times 10^{-7}/°C.$ | (without flexion) 130 | (without flexion) 150 | (with flexion) 172 | (with flexion) 163 | (with flexion) 179 | (with flexion) 165 |
| | Hv (kgf/mm$^2$) | 780 | 930 | 650 | 680 | 700 | 854 |
| | RA (p) | 0.3 | 0.7 | 2.1 | 2.2 | 0.04 | 0.02 |
| | Diameters of crystals (μ) | 0.02~0.03 | 0.2~0.3 | 10~20 | 10~20 | 10~20 | 10~20 |
| | Predominant crystals | G.α-Q | G.α-Q | C.G.W | C.G.W | C.G | C.G |

G: Gahnite
Q: Quartz
W: Willemite
C: Crystobalite

TABLE 2

| | | Examples | | | | | | | | | | |
|---|---|---|---|---|---|---|---|---|---|---|---|---|
| No. | | 1 | 2 | 3 | 4 | 5 | 6 | 7 | 8 | 9 | 10 | 11 |
| Composition of parent glass (weight %) | $SiO_2$ | 32.0 | 35.0 | 40.0 | 40.0 | 44.0 | 45.0 | 46.0 | 48.0 | 50.0 | 54.0 | 56.0 |
| | $Al_2O_3$ | 12.8 | 13.0 | 14.8 | 9.0 | 13.7 | 18.0 | 18.5 | 24.0 | 18.2 | 16.0 | 16.0 |
| | ZnO | 34.0 | 20.0 | 19.0 | 20.0 | 26.0 | 17.2 | 17.0 | 12.6 | 13.0 | 12.0 | 11.0 |
| | MgO | 11.0 | 15.0 | 14.0 | 15.0 | 8.0 | 6.0 | 6.5 | 7.0 | 7.5 | 6.0 | 5.0 |
| | PbO | 2.0 | 7.5 | 4.0 | 2.0 | 2.0 | 1.5 | 2.0 | 2.0 | 2.5 | 1.25 | 1.0 |
| | CaO | | 0.5 | | | | 1.0 | 1.5 | | | | |
| | BaO | 3.0 | 2.5 | 3.0 | 3.3 | 4.0 | 1.0 | | 2.0 | 2.5 | 2.0 | 3.0 |
| | SrO | | 0.5 | | 2.0 | | | | | | | |
| | $TiO_2$ | 5.0 | 5.8 | 5.0 | 5.0 | 4.0 | 10.0 | 7.0 | 4.0 | 6.0 | 7.0 | 6.0 |
| | $As_2O_3$ | $Sb_2O_3$ 0.2 | $Sb_2O_3$ 0.2 | 0.2 | $Sb_2O_3$ 0.2 | 0.3 | 0.3 | 0.3 | 0.4 | 0.3 | 0.3 | 0.3 |
| | | | | | $ZrO_2$ 0.8 | | $B_2O_3$ 1.2 | | | | $P_2O_5$ 1.45 | $Y_2O_3$ 1.7 |
| | | | | | $CaF_2$ 2.7 (F = 1.3) | | | | | | | |
| Rate of rising of temperature (°C./hr) | | 180 | 180 | 450 | 450 | 180 | 180 | 180 | 276 | 300 | 600 | 276 |
| Heat treatment temperature (°C.) | | 900 | 900 | 950 | 900 | 950 | 1100 | 1100 | 1100 | 1100 | 1100 | 1100 |
| Holding time (hr) | | 1 | 2 | 3 | 2 | 1 | 2 | 2 | 2 | 2 | 2 | 3 |
| Glass-ceramic | $\alpha \times 10^{-7}/°C.$ | 75 | 78 | 80 | 85 | 85 | 130 | 125 | 140 | 135 | 158 | 162 |
| | Hv(kgf/mm$^2$) | 765 | 780 | 795 | 798 | 800 | 995 | 980 | 1020 | 1040 | 1090 | 1100 |
| | RA(p) | 0.9 | 0.01 | 0.02 | 0.04 | 0.3 | 0.04 | 0.04 | 0.02 | 0.02 | 0.01 | 0.01 |
| | Diameters of crystals (μ) | ← | ← | 0.02~0.03 | → | → | ← | ← | 0.2~0.3 | → | → | → |
| | Predominant crystals | ← | ← | G. | → | → | ← | ← | G. α-Q | → | → | → |

| | | Examples | | | | | | | | |
|---|---|---|---|---|---|---|---|---|---|---|
| No. | | 12 | 13 | 14 | 15 | 16 | 17 | 18 | 19 | 20 |
| Composition of parent glass (weight %) | $SiO_2$ | 58.0 | 52.0 | 50.0 | 47.0 | 49.0 | 47.0 | 51.0 | 40.0 | 35.0 |
| | $Al_2O_3$ | 15.0 | 19.0 | 20.0 | 17.0 | 20.0 | 19.0 | 21.0 | 15.0 | 13.0 |
| | ZnO | 13.0 | 12.5 | 12.7 | 17.0 | 11.5 | 17.0 | 11.0 | 20.0 | 21.0 |
| | MgO | 5.0 | 6.0 | 7.0 | 7.0 | 8.0 | 6.0 | 6.0 | 13.0 | 14.0 |
| | PbO | 2.7 | 1.2 | 2.0 | 3.0 | 3.0 | 2.2 | 2.0 | 2.0 | 7.0 |
| | CaO | | | | | 2.0 | | | | 1.0 |
| | BaO | | 2.0 | 2.0 | 1.0 | | | | 1.7 | 2.0 |
| | SrO | | | | | | | 1.25 | 3.0 | 1.0 |
| | $TiO_2$ | 6.0 | 7.0 | 6.0 | 7.0 | 6.0 | 7.0 | 6.0 | 5.0 | 5.8 |
| | $As_2O_3$ | 0.3 | 0.3 | 0.3 | 0.3 | 0.3 | 0.3 | 0.3 | 0.3 | $Sb_2O_3$ 0.2 |
| | | | | | $Li_2O$ 0.5 | | $MnO_2$ 1.5 | $Ni_2O_3$ 1.45 | | |
| Rate of rising of | | 180 | 168 | 210 | 90 | 120 | 180 | 210 | 156 | 180 |

TABLE 2-continued

|  |  |  |  |  |  |  |  |  |  |
|---|---|---|---|---|---|---|---|---|---|
| temperature (°C./hr) |  |  |  |  |  |  |  |  |  |
| Heat treatment temperature (°C.) | 1000 | 1000 | 1000 | 950 | 1000 | 1050 | 1050 | 1100 | 1100 |
| Holding time (hr) | 3 | 2 | 3 | 2 | 4 | 2 | 3 | 3 | 3 |
| Glass-ceramic α × 10⁻⁷/°C. | 41 | 47 | 57 | 93 | 100 | 120 | 140 | 170 | 200 |
| Hv(kgf/mm²) | 720 | 760 | 800 | 850 | 950 | 950 | 1030 | 1090 | 1100 |
| RA(p) | 0.01 | 0.01 | 0.02 | 0.01 | 0.03 | 0.04 | 0.01 | 0.02 | 0.03 |
| Diameters of crystals (μ) | ← | 0.02~0.03 | → | ← | ← | 0.2~0.3 | → | → | → |
| Predominant crystals | ← |  | G. | → | ← | ← | G. α-Q | → | → |

TABLE 3

|  |  | Examples |  |  |  |  |  |  |  |  |  |  |  |
|---|---|---|---|---|---|---|---|---|---|---|---|---|---|
|  | No. | 1 | 2 | 3 | 4 | 5 | 6 | 7 | 8 | 9 | 10 | 11 | 12 |
| Composition of parent glass (weight %) | SiO₂ | 47.0 | 54.0 | 40.0 | 45.0 | 50.0 | 58.0 | 32.0 | 35.0 | 52.0 | 63.0 | 51.0 | 60.0 |
|  | Al₂O₃ | 18.0 | 16.0 | 21.0 | 20.0 | 20.0 | 12.0 | 11.0 | 23.0 | 19.0 | 7.0 | 18.0 | 10.0 |
|  | ZnO | 18.0 | 18.0 | 25.0 | 20.0 | 13.0 | 13.0 | 32.0 | 19.0 | 13.0 | 10.0 | 14.0 | 11.0 |
|  | MgO | 6.0 | 3.0 | 6.0 | 4.2 | 7.0 | 5.0 | 16.0 | 5.0 | 7.0 | 6.0 | 6.0 | 7.0 |
|  | PbO | 3.0 | 1.0 | 1.0 | 2.5 | 2.0 | 2.0 | 3.0 | 12.0 | 2.0 | 2.0 | 3.0 | 5.0 |
|  | CaO |  | 0.7 |  | 1.0 |  |  | 1.0 |  | 1.0 | 1.7 |  |  |
|  | BaO | 0.7 |  | 1.0 |  | 2.0 |  | 1.0 |  |  |  |  |  |
|  | SrO | 2.0 |  | 1.0 |  |  |  |  |  | 1.7 |  |  | 1.7 |
|  | TiO₂ | 5.0 | 6.0 | 4.0 | 3.0 | 5.7 | 7.0 | 3.0 | 3.0 | 5.7 | 10.0 | 5.5 | 5.0 |
|  | As₂O₃ | 0.3 | 0.3 | Sb₂O₃ 0.3 | 0.3 | 0.3 | 0.3 | Sb₂O₃ 0.3 | Sb₂O₃ 0.3 | 0.3 | 0.3 | 0.5 | 0.3 |
|  |  |  | P₂O₅ 1.0 | WO₃ 0.7 | B₂O₃ 4.0 |  | CaF₂ 2.7 (F = 1.3) | ZrO₂ 0.7 | SnO₂ 1.0 |  |  |  |  |
| First heat treatment | Rate of rising of temperature (°C./hr) | 100 | 100 | 100 | 100 | 100 | 200 | 100 | 300 | 100 | 100 | 150 | 100 |
|  | Nucleating temperature (°C.) | 670 | 720 | 620 | 650 | 700 | 720 | 600 | 600 | 700 | 780 | 720 | 750 |
|  | Holding time (hr) |  |  |  |  |  |  |  |  |  |  |  |  |
| Second heat treatment | Rate of rising of temperature (°C./hr) | 50 | 20 | 50 | 50 | 30 | 10 | 30 | 50 | 30 | 10 | 25 | 10 |
|  | Crystal growing temperature (°C.) | 780 | 870 | 680 | 700 | 850 | 880 | 630 | 650 | 850 | 910 | 860 | 900 |
|  | Holding time (hr) | 2 | 3 | 2 | 2 | 3 | 4 | 2 | 1 | 3 | 5 | 3 | 5 |
| Glass-ceramic | α × 10⁻⁷/°C. | 50 | 43 | 55 | 53 | 48 | 40 | 60 | 57 | 45 | 28 | 44 | 33 |
|  | Tg (°C.) | 870 | 883 | 815 | 854 | 875 | 890 | 783 | 788 | 872 | 901 | 880 | 897 |
|  | Hv(kgf/mm²) | 813 | 820 | 845 | 850 | 890 | 893 | 754 | 772 | 880 | 756 | 870 | 750 |
|  | RA(p) | 0.02 | 0.01 | 0.04 | 0.03 | 0.01 | 0.02 | 0.09 | 0.03 | 0.02 | 0.01 | 0.03 | 0.01 |
|  | Diameters of crystals | ← | ← | ← | ← | ← | 0.005~0.02 | → | → | → | → | → | → |
|  | Predominant crystals | ← | ← | ← | ← | ← | G. | → | → | → | → | → | → |

What is claimed is:

1. A glass-ceramic obtained by melting and heat treating a glass being substantially free of an alkali ingredient and comprising the following ingredients in weight percent:

| | |
|---|---|
| SiO₂ | 30–65%, |
| Al₂O₃ | 5–25%, |
| ZnO | 8–40%, |
| MgO | 2–20%, |
| PbO | 0.5–15%, |
| CaO + SrO + BaO | 0–15%, |
| TiO₂ | 2–15%, |
| B₂O₃ | 0–6%, |
| La₂O₃ + Y₂O₃ + Gd₂O₃ + Ta₂O₅ + Nb₂O₅ + WO₃ | 0–10%, |
| ZrO₂ + P₂O₅ + SnO₂ in which ZrO₂ | 0–5%, 0–2.5%, |
| P₂O₅ | 0–5%, |
| SnO₂ | 0–2%, |
| As₂O₃ + Sb₂O₃ | 0–2%, |
| MnO₂ + Ni₂O₃ + CO₂O₃ + Fe₂O₃ + Cu₂O + GeO₂ + Bi₂O₃ | 0–10%, |
| Li₂O + Na₂O | 0–1%, | and a total amount of F contained in a fluoride or fluorides of one or more metal elements in said metal oxide or oxides to form a glass-ceramic containing gahnite as predominant crystals, said glass-ceramic being substantially free of α-cristobalite and willemite, being free of flexion in its thermal expansion curve, having diameters of crystals grown ranging between 0.02 and 5 μ, having coefficients of thermal expansion in the range of about 41 -200×10⁻⁷/°C., and exhibiting an opaque appearance.

2. A glass-ceramic as claimed in claim 1 in which the ratio of MgO to PbO+CaO+SrO+BaO in weight is within the range between 1:1 and 3:1.

3. A glass-ceramic as claimed in claim 1 in which the MgO is present in the glass in an amount of greater than 2% by weight.

4. A glass-ceramic as claimed in claim 1 in which the MgO is present in the glass in an amount of about 5–20% by weight.

5. A glass-ceramic obtained by melting and heat treating a glass being substantially free of an alkali ingredient and comprising the following ingredients in weight percent:

| | |
|---|---|
| $SiO_2$ | 30–65%, |
| $Al_2O_3$ | 5–25%, |
| $ZnO$ | 8–40%, |
| $MgO$ | 2–20%, |
| $PbO$ | 0.5–15%, |
| $CaO + SrO + BaO$ | 0–15%, |
| $TiO_2$ | 2–15%. |
| $B_2O_3$ | 0–6%, |
| $La_2O_3 + Y_2O_3 + Gd_2O_3 + Ta_2O_5 + Nb_2O_5 + WO_3$ | 0–10%, |
| $ZrO_2 + P_2O_5 + SnO_2$ | 0–5%, |
| in which $ZrO_2$ | 0–2.5%, |
| $P_2O_5$ | 0–5%, |
| $SnO_2$ | 0–2%, |
| $As_2O_3 + Sb_2O_3$ | 0–2%, |
| $MnO_2 + Ni_2O_3 + CO_2O_3 + Fe_2O_3 + Cu_2O + GeO_2 + Bi_2O_3$ | 0–10%, |
| $Li_2O + Na_2O$ | 0–1%, |
| and a total amount of F | 0–5%, |
| contained in a fluoride or fluorides of one or more metal elements in said metal oxide or oxides | | to form a glass-ceramic containing gahnite as predominant crystals, said glass-ceramic having diameters of crystals grown ranging between 0.005 and 0.03 $\mu$, and exhibiting a transparent appearance.

6. A glass-ceramic as claimed in claim 5 in which the MgO is present in the glass in an amount of greater than 2% by weight.

7. A glass-ceramic as claimed in claim 5 in which the MgO is present in the glass in an amount of about 3–20% by weight.

8. A glass-ceramic as claimed in claim 5 wherein the glass ceramic has a coefficient of thermal expansion in the range of about $28–60 \times 10^{-7}/°C$.

* * * * *